SUBSCRIBER TELEVISION SYSTEM

Filed June 25, 1948 2 Sheets-Sheet 1

NATHAN W. ARAM
*INVENTOR.*

BY Bruce L. Birchard
*HIS AGENT*

NATHAM W. ARAM
INVENTOR.
BY [signature]
HIS AGENT

Patented Sept. 11, 1951 2,567,539

UNITED STATES PATENT OFFICE 2,567,539

SUBSCRIBER TELEVISION SYSTEM

Nathan W. Aram, Park Ridge, Ill., assignor to Zenith Radio Corporation, a corporation of Illinois Application June 25, 1948, Serial No. 35,206

12 Claims. (Cl. 178—5.1)

Figure 1:
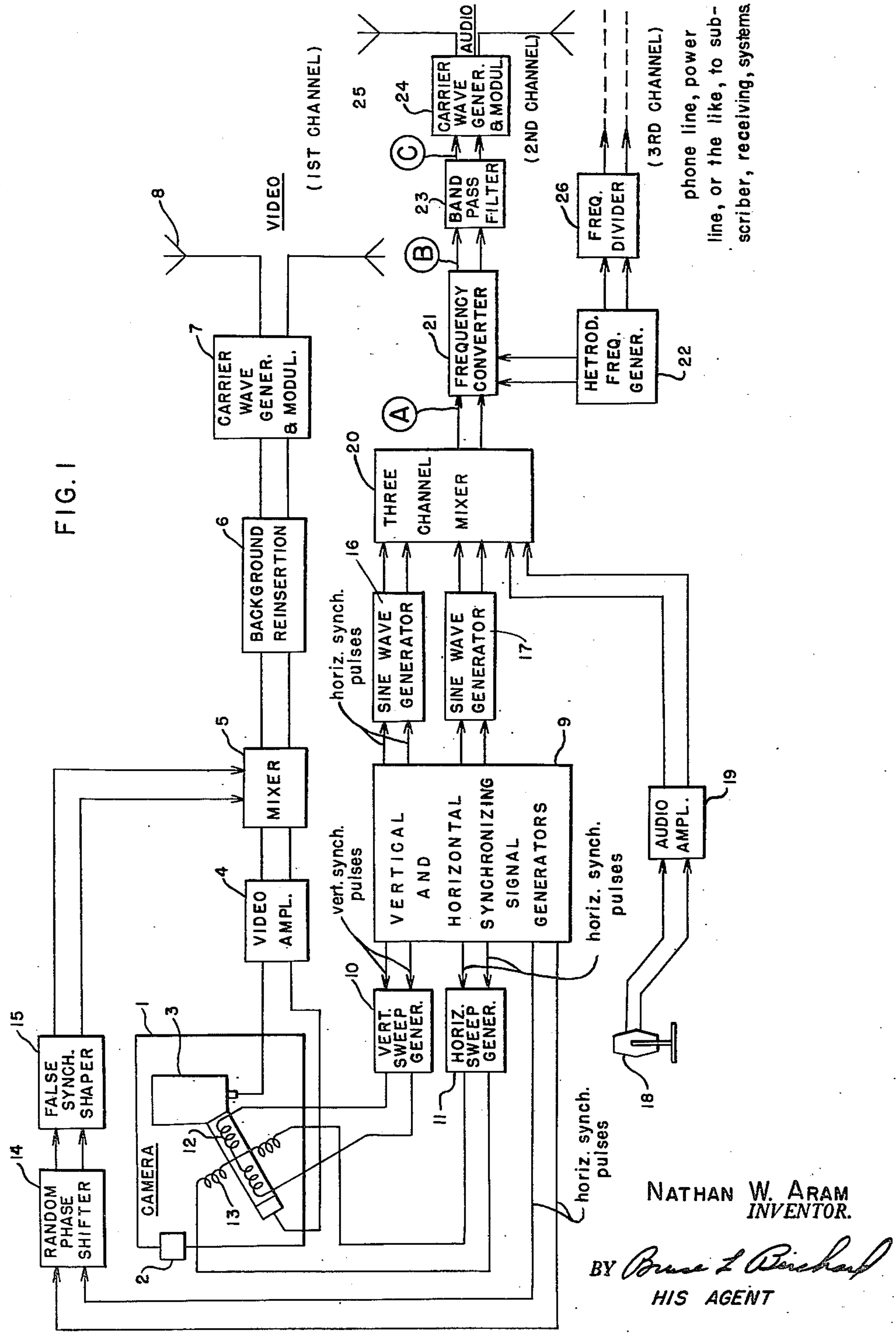

This invention relates to television systems, and more particularly to such systems in which television signals are transmitted in coded form, so that proper reproduction thereof may be effected solely in subscriber receiving systems.

It is an object of this invention to provide an image transmission system which transmits television signals in coded form, such coded form comprising transmitting a portion of the television signals on one channel combining a further portion of these signals with the usual audio signals, and transmitting the combined signals on a second channel.

Another object of this invention is to provide such a system in which such combined signals, consisting of a portion of the television signals combined with the audio signals, are transmitted on the second channel in coded or scrambled form.

A still further object of this invention is to provide such a system in which the combined signals are transmitted on the second channel in coded or scrambled form, and wherein a decoding key signal is transmitted to subscriber receiving systems on a third channel so that these receiving systems alone may decode and reproduce the television signals.

A further object of this invention is to provide a receiving system for operation in conjunction with the aforementioned transmission system in which the combined signals are decoded in response to the key signal, and the combined portion of the television signals is separated from the audio signals and utilized with the other portion of the television signals to reproduce the television image.

It is a particular object of this invention to provide such a system in which a portion of the television signals, namely the vertical and horizontal synchronizing components of these signals is combined with the audio-signal components and transmitted on the usual audio carrier, and the remaining components of the television signals are transmitted on the usual video carrier.

Another particular object of this invention is to provide such a system in which the combined signals are frequency converted or coded on the audio carrier by a heterodyne signal, and wherein the heterodyne signal is frequency divided and transmitted as a decoding key signal to subscriber receiving systems by means of some private electrical link such as phone lines, power lines, or the like, between the transmitter and respective subscriber receiving systems.

Yet another particular object of the invention is to provide a subscriber receiving system in which such combined signals are decoded in response to the key signal received over the phone lines, or the like, and wherein the combined portion of the television signal is separated from the audio signal and utilized with the other portion of the television signal to reproduce the television image.

Figure 2:
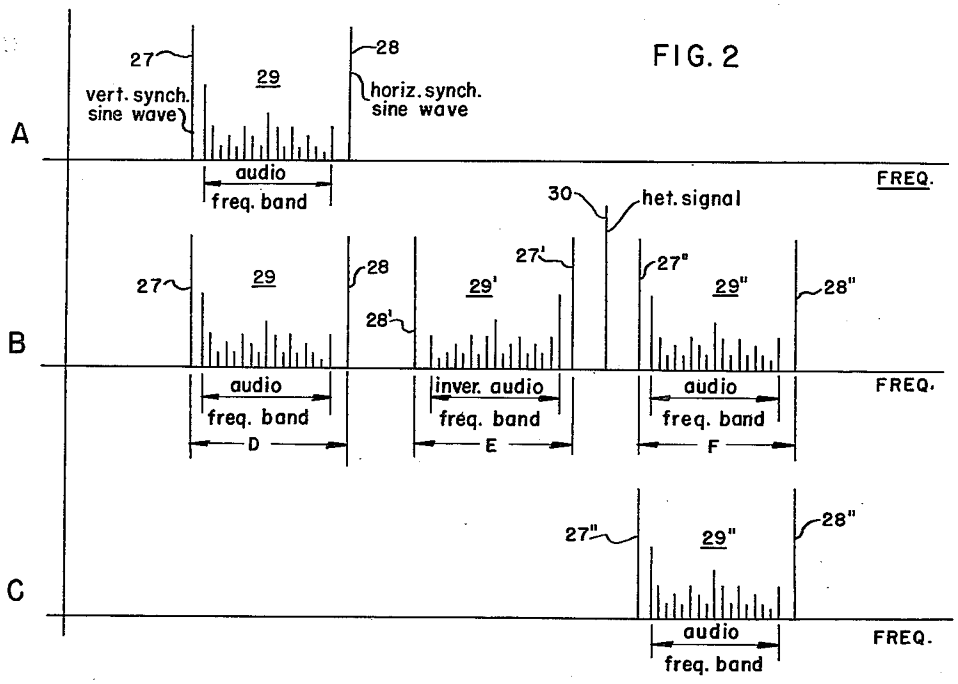
Figure 3:
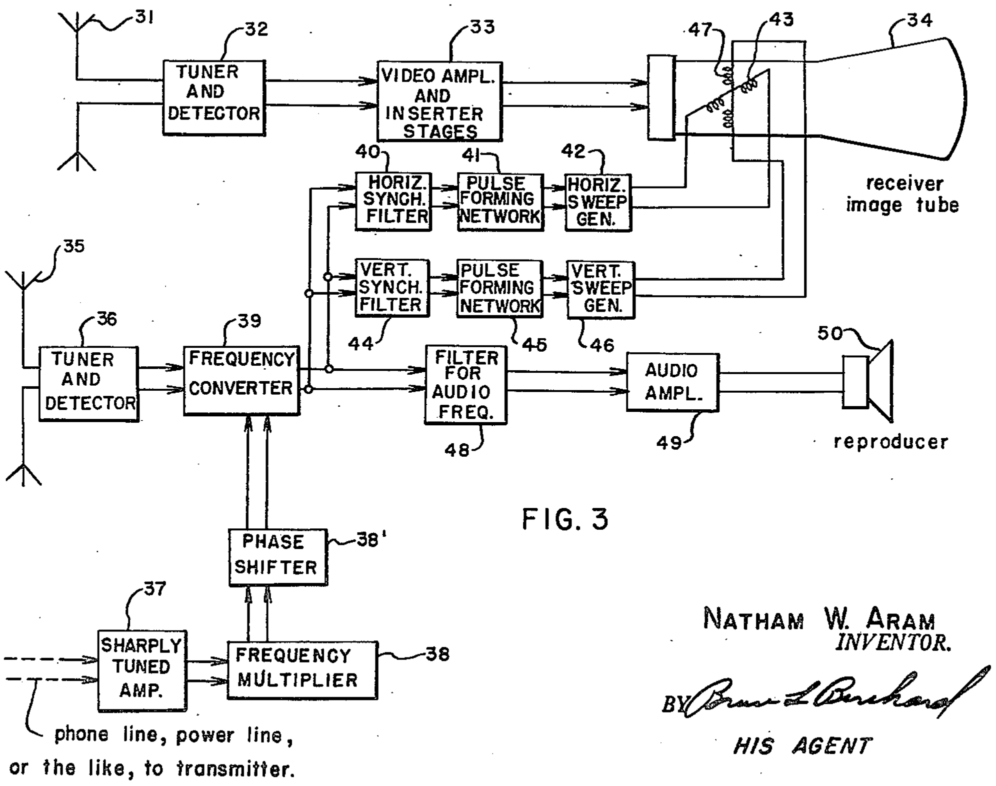

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1 shows an image transmission system operating in accordance with the present invention, Figure 2 shows various diagrams useful in the understanding of the operation of the proposed system, and Figure 3 shows a receiving system for operation in conjunction with the transmitting system of Figure 1.

Referring now to Figure 1 an image transmitting system is illustrated therein having a camera 1. Camera 1 includes a usual lens system 2 for focusing the image of an object on television pick-up tube 3. Video signals from pick-up tube 3 are amplified in video amplifier stages 4, and these amplified signals may be impressed on a mixer stage 5, in which spurious synchronizing signals may be mixed with the video signals to render the reproduction of these video signals by unauthorized receiving systems difficult, if not impossible. Signals from mixer 5 are applied to the usual background reinsertion device 6, and are then impressed on carrier wave generator and modulator stage 7, wherein they are caused to modulate the video carrier for radiation from antenna 8.

Vertical and horizontal synchronizing pulses are generated by signal generators 9, the vertical synchronizing pulses being used to synchronize vertical sweep generator 10, and the horizontal synchronizing pulses being used to synchronize horizontal sweep generator 11. The vertical sweep potential from generator 10 is applied to the vertical sweep coil 12 of pick-up tube 3, and the horizontal sweep potential from generator 11 is applied in the usual manner to horizontal sweep coil 13.

Vertical and horizontal synchronizing pulses may further be passed through a random phase shifter 14 of the type disclosed in Patent No.

2,510,046 issued May 30, 1950, to Alexander Ellett et al. and assigned to the present assignee, and false synchronizing pulse shaper 15 to mixer 5 to provide spurious synchronizing pulses in the video signal. It is to be understood that the spurious synchronizing pulses may be provided in any known manner, by any signal generator means, or the like and it is to be further understood that false synchronizing pulses need not necessarily be included in the video signal.

Horizontal synchronizing pulses from generator 9 are further utilized to synchronize a sine wave generator 16, whereby the frequency of the sine wave generated by this generator is that of the horizontal synchronizing pulses. Similarly, vertical synchronizing pulses from generator 9 are applied to sine wave generator 17, the sine wave generated by generator 17 having a frequency identical to the recurrence frequency of the vertical synchronizing pulses. Microphone 18 is coupled to audio amplifier 19, and the amplified audio signals from amplifier 19 are impressed on a three channel mixer stage 20, together with the sine wave signals from respective generators 16 and 17. The mixed signals from mixer 20 are heterodyned in frequency converter stage 21 with a heterodyning signal from heterodyne signal generator 22. The signals from converter 21 are then passed through a band pass filter 23, this filter passing only the desired frequency band of converted signals.

The resulting signals from band pass filter 23 are impressed on carrier wave generator and modulator stage 24, where they modulate the carrier wave and are then radiated by antenna 25. The heterodyne signal from generator 22 is further applied to a frequency divider 26, wherein this signal is divided to a frequency suitable for transmission by wire line conductor, or the like, to subscriber receiving systems. The frequency divided signal from frequency divider 26 which will hereinafter be referred to as the key signal, is transmitted to subscriber receiving systems by any suitable link such as phone lines, power lines, coaxial cables, or the like, or may be radiated thereto.

The operation of the circuit of Figure 1 may best be understood by reference to Figure 2. Figure 2—A shows a frequency band occupied by the signals mixed in mixer 20 and as they appear at point A in Figure 1. The lower frequency sine wave from generator 17 of Figure 1, representing the frequency of the vertical synchronizing pulses, is shown at 27, and the higher frequency sine wave from generator 16 of Figure 1, representing the frequency of the horizontal synchronizing pulses, is shown at 28. Lying between these signals are the audio signals from amplifier 19 of Figure 1, which are shown at 29. The band pass characteristics of amplifier 19 in Figure 1 should be made such that the audio frequency band lies between the respective frequencies of signals 27 and 28, but does not include these frequencies. For example, the sine wave 27 is usually 60 cycles, and the sine wave 28 is usually 15,750 cycles, so that the audio frequency should extend between, but not include, these frequencies.

As previously pointed out, the signals 27, 28 and 29 are heterodyned in frequency converter 21 of Figure 1 with a heterodyne signal from heterodyne signal generator 22, this signal being shown as having a frequency 30 in Figure 2—B. Hence, at point B in Figure 1 a composite signal appears, as shown in Figure 2—B. This composite signal includes the frequencies of the original signal of Figure 2—A shown at D, and the heterodyne signal 30 and associated side bands. The modulated heterodyne signal 30 has a lower side band composed of the signals of Figure 2—A in inverted frequency order and displaced a certain amount from their previous position in the frequency spectrum, this lower side band being shown as E, and an upper side band which is composed of the signals of Figure 2—A in their original frequency order, but displaced a further certain amount from their original position in the spectrum, this upper side band being shown as F.

It is proposed in the present invention to transmit solely the side bands E or F of the composite signal shown in Figure 2—B, so that the desired information may be transmitted in coded form. In the side band E, the signal frequencies are inverted and the information contained in this side band is therefore unintelligible for normal reception. In the side band F, the signal frequencies are not inverted, but they are translated in the spectrum by an amount equal to the frequency of the heterodyning signal 30. When the frequency of signal 30 is small, distortion and dissonance are caused in musical signals carried by this side band, but intelligibility is not destroyed therein. However, higher frequency values of signal 30 result in increasing loss of intelligibility in side band F, and when the frequency of heterodyne signal 30 is given such a value that the signals in side band F become supersonic, the desired coding is definitely obtained. Therefore, it can be seen that to obtain a coded signal which retains all the components of the uncoded signal shown in Figure 2—A, it is necessary merely to select either side bands E or F of Figure 2—B, by means of filter 23 of Figure 1, and to modulate the audio carrier with the selected sideband. Figure 2—C shows such signals as they appear at C in Figure 1, the selected signals in this instance being those of side band F of Figure 2—B.

It can be seen, therefore, that the present transmitter transmits video signals either having no synchronizing signals, or having false synchronizing signals included therein, the true synchronizing signals being mixed with the audio signals and transmitted on the audio carrier in coded form. Hence, it would be extremely difficult for a receiving system, not having proper corrective circuits, and not in receipt of the necessary key signal, to reproduce properly the television signals transmitted by the present transmitting system. Such unauthorized reproduction of the television signals could be rendered even more difficult by providing frequency divider 26 with means for changing the frequency of the key signal in a predetermined manner.

The proposed receiving system for operation in conjunction with the transmitting system of Figure 1 is shown in Figure 3. In this system video signals are intercepted by antenna 31, and such signals are tuned and detected in tuner and detector stages 32. Signals from stages 32 are then impressed on the usual video amplifier direct-current and inserter stages 33, and from there to the control electrode of receiver image tube 34.

The audio carrier is received on antenna 35, and tuned and demodulated in stages 36. The key signal is received by means of power lines, phone lines, or the like, which lines are coupled to a sharply tuned amplifier stage 37. Stage 37 amplifies only the key signal frequency, and rejects all other signals, such as noise, interference, and the like, as well as signals normally carried by such lines. The amplified key signal from amplifier 37 is impressed on frequency multiplier 38, wherein it is multiplied to the original frequency of the heterodyne signal 30 of Figure 2—B. The heterodyne signals from frequency multiplier 38 are impressed on a phase shifter stage 38' where they are adjusted to the correct phase, and signals from this stage together with signals from tuner and demodulator stages 36, are impressed on a frequency converter stage 39 and heterodyned therein. The output signals from converter 39 again have the appearance of the signals of Figure 2—B. The sine wave signal representing the horizontal synchronizing pulses is removed from the output signal of converter 39 by filter 40, which signal may be reformed into pulses in network 41, these pulses being in turn utilized to trigger the horizontal sweep generator 42 at the horizontal synchronizing rate, the sweep potential generated by sweep generator 42 being impressed on the horizontal sweep coils 43 of image tube 34 in the usual manner. It is apparent, however, that when so desired, the sine wave signal derived from filter 40 may be utilized directly to synchronize the horizontal sweep generator, without the necessity of reforming this signal into pulses. Similarly, the sine wave signal representing the vertical synchronizing pulses is removed from the output of inverter 39 by filter 44, and this signal may be used directly to effect vertical synchronism or it may be reformed into pulses in pulse forming network 45. The pulses generated by network 45 are used to trigger the vertical sweep generator 46 at the vertical synchronizing rate, the sweep signals from generator 46 being impressed on vertical sweep coils 47 of image tube 34.

The audio signals are removed from the output of inverter 39 by means of filter 48, and these signals are amplified in stages 49, and then impressed on a usual signal translating device or reproducer 50.

In this manner the receiving system operates in conjunction with the transmitting system of Figure 1. The receiver recovers the synchronizing signals from the audio carrier, and thereby synchronizes the sweep of the image tube 34 with the sweep of the transmitter pick-up tube.

The various individual components of the transmitter and receiver described here in are well known, and may take any conventional form, and a detailed description thereof is believed to be unnecessary.

As previously described, the decoding key signal may be transmitted to subscriber receiver systems by means of power lines, phone lines or the like, and some metering arrangement is provided in these lines so that each subscriber may be charged for the use of the key signal. When phone lines are used, the key signal may be switched at the telephone or charged to respective subscribers requesting it, and the time of use may be recorded in the telephone exchange and a suitable billing procedure established. When power lines are used, it may perhaps be convenient to provide meters at the various subscriber systems coupled to the lines, these meters recording the times of use of the key signal by respective subscribers.

This system provides, therefore, an image transmission system wherein a portion of the video signals, namely the synchronizing signal portion, is removed, and this portion mixed with the audio signal and transmitted in coded form therewith on the audio carrier, a key signal being further transmitted to decode these signals in the receiving system. It is apparent, however, that other portions of the television signals may be so treated, and the invention is not limited to the removal and transmission of the synchronizing signals in the above described manner.

Similarly, coding means other than frequency conversion may be used to code the signals carried by the audio carrier, and furthermore, when so desired, these signals may be transmitted on this carrier in an uncoded condition.

Therefore, while certain preferred embodiments of the invention have been shown and described, they are not to be construed as limiting factors as modifications may be made to the invention without departing from the scope thereof. The appended claims are intended to cover all such modifications as fall within the true spirit and scope of the invention.

I claim:

1. A subscription type of television transmitter comprising: a picture-converting device; a scanning system for controlling said device to develop during recurrent trace intervals a video-frequency signal representing a subject scanned by said device and including a synchronizing-signal generator for developing a synchronizing signal; means for modulating said video-frequency signal on a first carrier wave for radiation to a point remote from said transmitter; a sound-converting device for producing an audio-frequency signal; a mixer device coupled to said synchronizing-signal generator and to said sound-converting device for combining said synchronizing signal and said audio-frequency signal to produce a combined signal; a coding circuit coupled to said mixer device for coding said combined signal in response to an applied coding signal; means for modulating said coded signal on a second carrier wave for radiation to said remote point; and means for supplying a coding signal to said coding circuit and for supplying a key signal representing said coding signal to a line circuit extending to said remote point.

2. A subscription type of television transmitter comprising: a picture-converting device; a scanning system for controlling said device to develop during recurrent trace intervals a video-frequency signal representing a subject scanned by said device and including a synchronizing-signal generator for developing a synchronizing signal during interposed retrace intervals; means for modulating said video-frequency signal on a first carrier wave for radiation to a point remote from said transmitter; a sound-converting device for producing an audio-frequency signal; a sine-wave generator controlled by said synchronizing-signal generator for producing a sine wave having a frequency substantially equal to the frequency of said synchronizing signal; a mixer device coupled to said sine-wave generator and to said sound-converting device for combining said sine-wave signal and audio-frequency signal to produce a combined signal; a coding circuit coupled to said mixer device for coding said combined signal in response to an applied coding signal; means for modulating said coded signal on a second carrier wave for radiation to said remote point; and means for supplying a coding signal to said coding circuit, and for supplying a key signal representing said coding signal to a line circuit extending to said remote point.

3. A subscription type of television transmitter comprising: a picture-converting device; a scanning system for controlling said device to develop during recurrent trace intervals a video-frequency signal representing a subject scanned by said device and including a synchronizing-signal generator for developing a synchronizing signal during interposed retrace intervals; means for modulating said video-frequency signal on a first carrier wave for radiation to a point remote from said transmitter; a sound-converting device for producing an audio-frequency signal; a sine-wave generator controlled by said synchronizing-signal generator for producing a sine wave having a frequency substantially equal to the frequency of said synchronizing signal; a mixer device coupled to said sine-wave generator and to said sound-converting device for combining said sine-wave signal and said audio-frequency signal to produce a combined signal; a frequency-converter circuit coupled to said mixer device for modulating said combined signal on an applied heterodyning signal; a band pass filter coupled to said frequency-converter circuit for passing a selected side band of said modulated signal; means for modulating said selected side band on a second carrier wave for radiation to said remote point; and means for supplying a heterodyning signal to said frequency-converter circuit and for supplying a key signal representing said heterodyning signal to a line circuit extending to said remote point.

4. A subscription type of television transmitter comprising: a picture-converting device; a scanning system for controlling said device to develop during recurrent trace intervals a video-frequency signal representing a subject scanned by said device and including a synchronizing-signal generator for developing a true synchronizing signal during interposed retrace intervals; apparatus coupled to said scanning system for developing a false synchronizing signal having a timing different from that of said true synchronizing signal; a first mixer device coupled to said picture-converting device and to said false synchronizing signal developing apparatus for combining said video-frequency signal and said false synchronizing signal to produce a coded television signal; means for modulating said coded television signal on a first carrier wave for radiation to a point remote from said transmitter; a sound-converting device for producing an audio-frequency signal; a sine-wave generator controlled by said synchronizing-signal generator for producing a sine wave having a frequency substantially equal to the frequency of said true synchronizing signal; a second mixer device coupled to said sine-wave generator and to said sound-converting device for combining said sine-wave signal and audio-frequency signal to produce a combined signal; a coding circuit coupled to said mixer device for coding said combined signal in response to an applied coding signal; means for modulating said coded signal on a second carrier wave for radiation to said remote point; and means for supplying a coding signal to said coding circuit and for supplying a key signal representing said coding signal to a line circuit extending to said remote point.

5. A subscription type of television receiver for utilizing a received composite television signal including a video-frequency signal modulated on a first carrier wave, and a combined synchronizing signal and audio-frequency signal modulated in coded form on a second carrier wave, and for utilizing a key signal received over a line circuit for decoding the combined signal, said receiver comprising: an image-reproducing device and an associated scanning system; means for supplying said video-frequency signal to said reproducing device; decoding apparatus for decoding said combined signal in response to said key signal; means for supplying said combined signal to said decoding apparatus; means for supplying said decoding key signal to said decoding apparatus; a sound-reproducing device; and separator apparatus coupled to said decoding apparatus for supplying said synchronizing signal to said scanning system and said audio-frequency signal to said sound-reproducing device.

6. A subscription type of television receiver for utilizing a received composite television signal including a video-frequency signal modulated on a first carrier wave, and a combined synchronizing signal and audio-frequency signal modulated in coded form on a second carrier wave, and for utilizing a key signal received over a line circuit for decoding the combined signal, said receiver comprising: an image-reproducing device and an associated scanning system; means for supplying said video-frequency signal to said reproducing device; decoding apparatus for decoding said combined signal in response to said key signal; means for supplying said combined signal to said decoding apparatus; means for supplying said decoding key signal to said decoding apparatus; a sound-reproducing device; a first filter network coupled to said decoding apparatus for supplying said audio-frequency signal to said sound-reproducing device; and a second filter network coupled to said decoding apparatus for supplying said synchronizing signal to said scanning system.

7. A subscription type of television receiver for utilizing a received composite television signal including a video-frequency signal modulated on a first carrier wave, and a combined sine-wave synchronizing signal and audio-frequency signal modulated in coded form on a second carrier wave, and for utilizing a key signal received over a line circuit for decoding the combined signal, said receiver comprising: an image-reproducing device and an associated scanning system; means for supplying said video-frequency signal to said reproducing device; decoding apparatus for decoding said combined signal in response to said key signal; means for supplying said combined signal to said decoding apparatus; means for supplying said decoding key signal to said decoding apparatus; a sound-reproducing device; a first filter network coupled to said decoding apparatus for supplying said audio-frequency signal to said sound-reproducing device; a second filter network coupled to said decoding apparatus for removing said sine-wave synchronizing signal from said combined signal; and a pulse-forming network coupled to said second filter network for developing a pulse signal in response to said sine-wave signal, and for supplying said pulse signal to said scanning system.

8. A subscription type of television system comprising: a picture converting device; a scanning system for controlling said device to develop during recurrent trace intervals a video-frequency signal representing a subject scanned by said device and including a synchronizing-signal generator for developing a synchronizing signal; a subscriber receiver; means for modulating said video-frequency signal on a first carrier wave for radiation to said receiver, a sound-converting device for producing an audio-frequency signal;

a mixer device coupled to said synchronizing-signal generator and to said sound-converting device for combining said synchronizing signal and said audio-frequency signal to produce a combined signal; a coding circuit coupled to said mixer device for coding said combined signal in response to an applied coding signal; means for modulating said combined signal on a second carrier wave for radiation to said receiver; means for supplying a coding signal to said coding circuit and for supplying a key signal representing said coding signal to a line circuit extending to said receiver; said receiver including, an image-reproducing device and an associated scanning system, means for supplying said video-frequency signal to said reproducing device, decoding apparatus for decoding said combined signal in response to said key signal, means for supplying said combined signal to said decoding apparatus, means for supplying said key signal to said decoding apparatus, a sound reproducing device, and separator apparatus coupled to said decoding apparatus for supplying said synchronizing signal to said scanning system and said audio-frequency signal to said sound-reproducing device.

9. A subscription type of television transmitter comprising: a picture-converting device; a scanning system for controlling said device to develop during recurrent trace intervals a video-frequency signal representing a subject scanned by said device; means for modulating said video-frequency signal on a carrier wave for radiation to a point remote from said transmitter; a sound-converting device for producing an audio-frequency signal representing audible information associated with the aforesaid subject; a coding circuit coupled to said sound-converting device for coding said audio signal; and means for concurrently transmitting said coded audio signal to said remote point.

10. A subscription type of television transmitter comprising: a picture-converting device; a scanning system for controlling said device to develop during recurrent trace intervals a video-frequency signal representing a subject scanned by said device; means for modulating said video-frequency signal on a first carrier wave for radiation to a point remote from said transmitter; a sound-converting device for producing an audio-frequency signal representing audible information associated with the aforesaid subject; a coding circuit coupled to said sound-converting device for coding said audio signal in response to an applied coding signal; means for modulating said coded audio signal on a second carrier wave for concurrent radiation to said remote point; and means for supplying a coding signal to said coding circuit and for supplying a key signal representing said coding signal to a line circuit extending to said remote point.

11. A subscription type of television receiver for utilizing a received composite television signal including a video-frequency signal modulated on a carrier wave, and for further utilizing a coded audio signal received concurrently with said video-frequency signal, said receiver comprising: an image-reproducing device and an associated scanning system; means for supplying said video-frequency signal to said reproducing device; a sound-reproducing device; circuit means for supplying said audio signal to said sound-reproducing device; and decoding apparatus coupled to said last-mentioned circuit means for decoding said audio signal.

12. A subscription type of television receiver for utilizing a received composite television signal including a video-frequency signal modulated on a first carrier wave and an audio-frequency signal modulated in coded form on a second carrier wave, and for utilizing a key signal received over a line circuit indicating the coding schedule of said audio signal, said receiver comprising: an image-reproducing device and an associated scanning system; means for supplying said video-frequency signal to said reproducing device; decoding apparatus responsive to an applied signal for decoding said audio signal; means for supplying said coded audio signal to said decoding apparatus; means for supplying said key signal to said decoding apparatus; a sound-reproducing device; and circuit means coupled to said decoding apparatus for supplying said audio signal to said sound-reproducing device.

NATHAN W. ARAM.

REFERENCES CITED

The following references are of record in the file of this patent:

UNITED STATES PATENTS

| Number | Name | Date |
|---|---|---|
| 1,754,876 | Clement | Apr. 15, 1930 |
| 1,769,920 | Gray | July 8, 1930 |
| 1,790,486 | Roberts | Jan. 17, 1931 |
| 1,919,804 | Ryan | July 25, 1933 |
| 1,932,253 | Ives | Oct. 24, 1933 |
| 2,114,500 | Nicolson | Apr. 19, 1938 |
| 2,310,197 | Hansell | Feb. 2, 1943 |
| 2,312,145 | Bradley | Feb. 23, 1943 |
| 2,403,059 | Dillenback | July 2, 1946 |

FOREIGN PATENTS

| Number | Country | Date |
|---|---|---|
| 421,937 | Great Britain | Jan. 2, 1935 |